Feb. 16, 1971    C. B. KING ET AL    3,562,857
DIELECTRIC MOLDING APPARATUS
Filed Oct. 9, 1968

INVENTORS
CHARLES B. KING
ROBERT T. SWANN
MARTIN J. MENGES
BY
ATTORNEYS

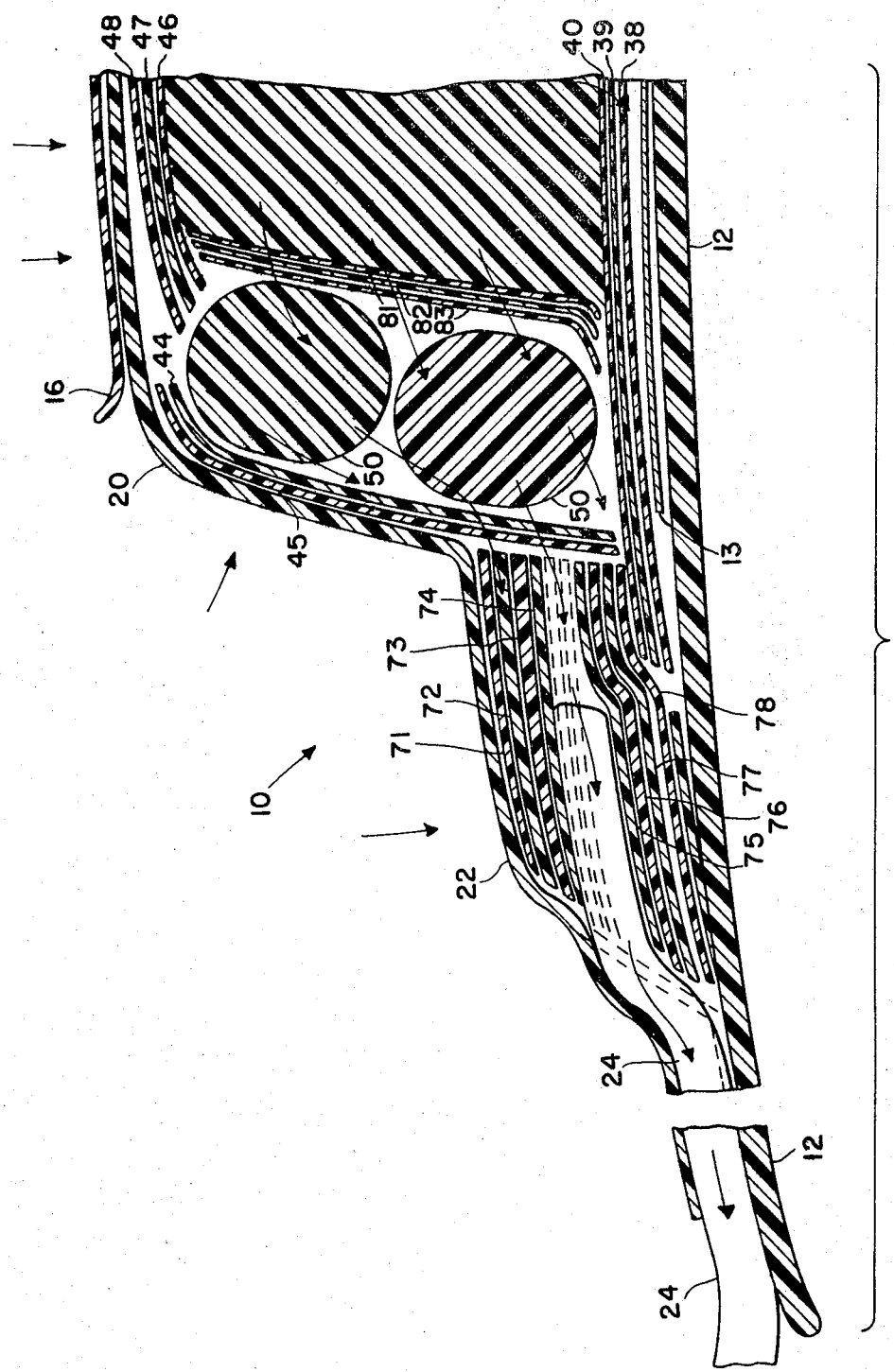

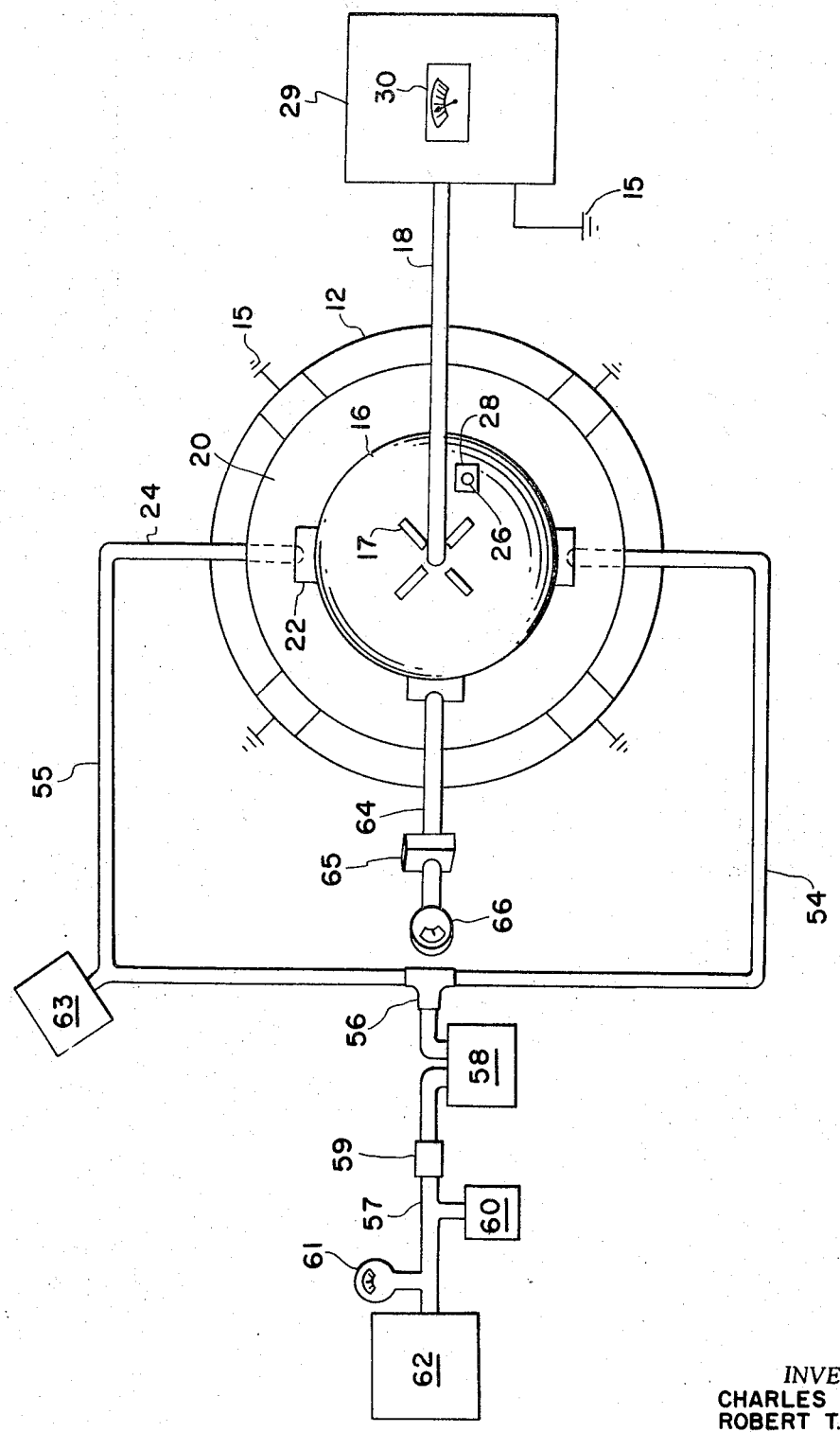

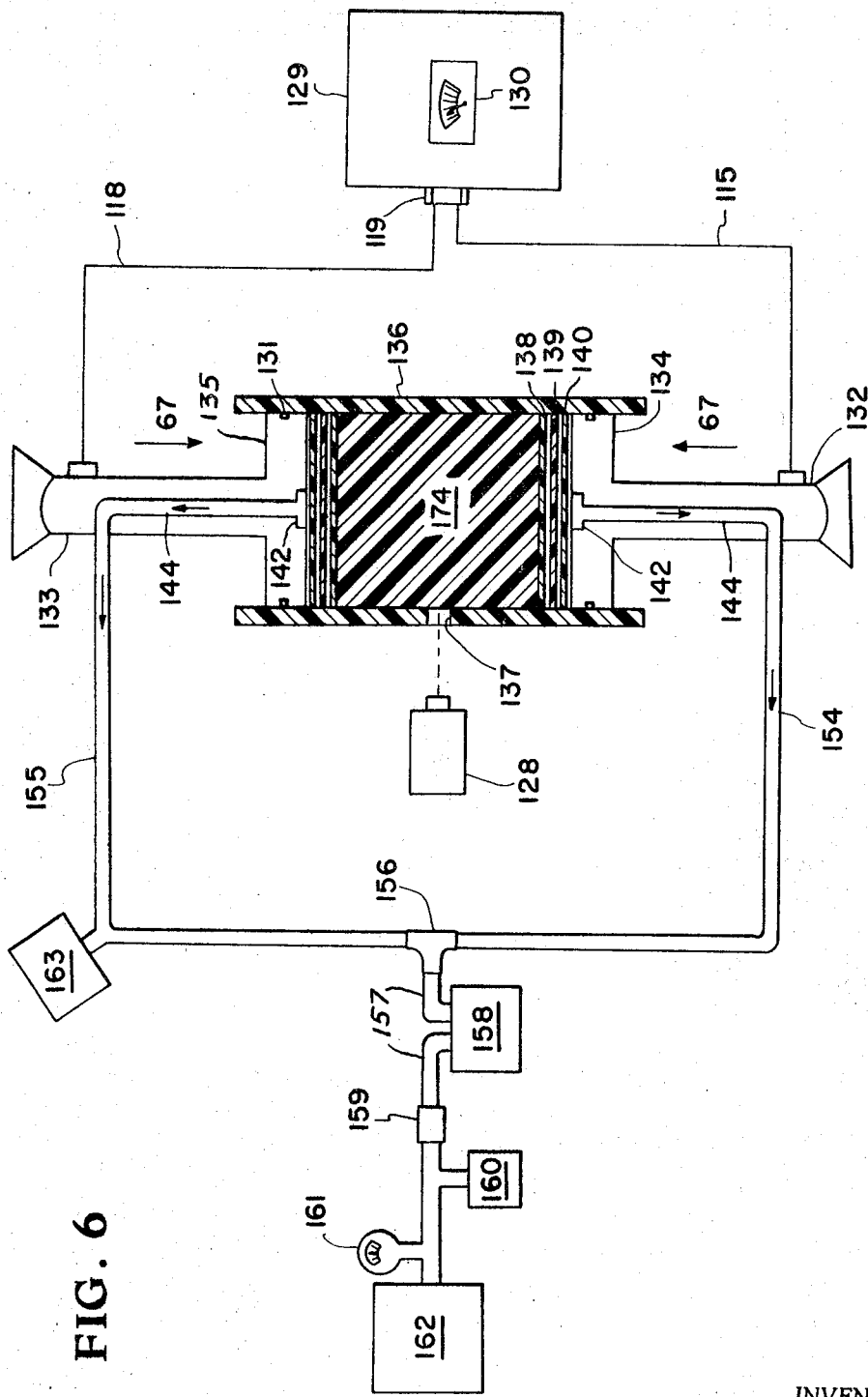

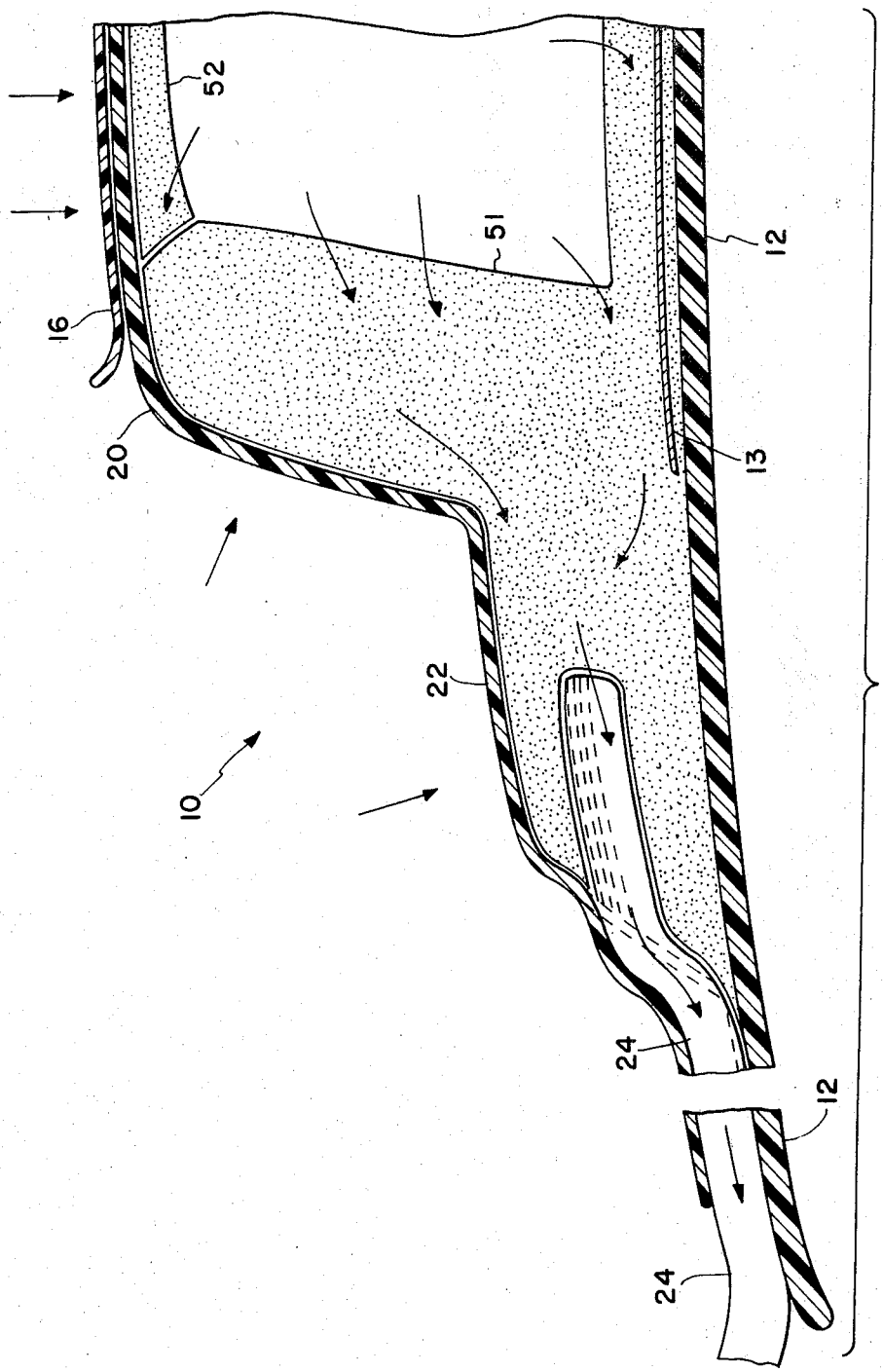

United States Patent Office 3,562,857
Patented Feb. 16, 1971

3,562,857
DIELECTRIC MOLDING APPARATUS
Charles B. King, Hampton, Robert T. Swann, Newport News, and Martin J. Menges, Seaford, Va., assignors to the United States of America as represented by the Administrator of the National Aeronautics and Space Administration
Filed Oct. 9, 1968, Ser. No. 766,244
Int. Cl. B29c 1/12; H05b 1/00
U.S. Cl. 18—6
21 Claims

ABSTRACT OF THE DISCLOSURE

An apparatus for the dielectric heating, fusing and hardening of an organic matrix to form plastic materials into a useful, shaped product.

---

The invention described herein was made by employees of the United States Government and may be manufactured and used by or for the Government for governmental purposes without the payment of any royalties thereon or therefor.

Plastic materials may be formed or shaped from a mixture of powdered thermoplastics and/or thermosetting materials by heating and compacting the batch in various ways. The usual method is conductive heating used in conjunction with mechanically or hydraulically activated presses. The compound ingredients are progressively heated and cured, starting at the surface of the mold or press, toward the center of the molding. This process is very lengthy with molding-curing cycles for such procedures extending up to 30 hours. Moreover, it has been found that success has been somewhat limited when one of the components of the plastic mixture is a good thermal insulator such as hollow phenolic spheres. These and other similar frangible spheres are load-sensitive and sometimes become fractured during the process. This at times makes the process undesirable for molding and curing insulative materials such as ablation compounds which utilize hollow spheres.

The present invention was developed to provide a process which overcomes the shortcomings of the prior art. Using this process, a mixture having frangible particles in it may be quickly molded and cured without rupturing the particles. Furthermore, since dielectric heating apparatus is used, the material heats uniformly throughout and reaches the desired temperature in a very short period of time. The complete process of the present invention lasts but a few hours. Normally, properly cured products can be obtained in one to two hours. The prior art, because of the necessity of utilizing conductive heating, inherently involved a more complicated process and failed to consistently produce thermosetting plastic materials having a reasonably uniform density. These density gradients resulted from pressure gradients which are inherent in the prior art methods. Quality control was very difficult to obtain because exact duplication of the molding and curing was very hard to achieve. Until this invention, it had been very difficult to determine when the proper degree of cure had been reached. With the present process, experimental parameters may be set up which more accurately indicate the point when proper cure has been reached. By utilizing the dielectric heating, the ingredients are more quickly and controllably heated. This minimizes density gradients in the molded compact. By further providing means for monitoring the process so as to be able to keep it within critical limits, actual quality control is a reality. The rapid heating of the mixture causes the resin matrix to soften and become a viscous fluid. The constant and uniform pressure applied by the flexible vacuum membrane compacts the ingredients in such a way that the maximum desired geometric placement of the particles involved is effectuated. Because the change to a fluid is so quick, uniform compactation throughout the mass of the molding is effected.

It is therefore an object of the present invention to provide a means for quickly molding and curing plastic materials.

Another object of this invention is to provide a method of quality control of the cure stage of the final product by monitoring the parameters of temperature, pressure, and evolved gas composition.

A further object of the present invention is to facilitate heating, fusing, and hardening of an organic matrix to form plastic materials into a useful plastic product having a desired molded shape.

Yet another object of the present invention is to provide a method of automated mass production of properly molded and cured plastic materials and of producing materials having a uniform density.

A still further object of the present invention is to provide a method of readily producing large, molded plastic articles.

Still another object of the present invention is to provide a method for quickly and accurately molding and curing plastic materials having as components frangible spheres and/or other frangible fillers.

These and other objects of the present invention will become more apparent upon examination of the drawings in conjunction with a reading of the specification.

In the drawings:

FIG. 4 shows a cross-sectional view of one embodiment of the present invention taken along line 4—4 of FIG. 3;

FIG. 5 shows a top view of the complete apparatus;

FIG. 6 shows another embodiment of the present invention having pressure piston means combined with the electrode means; and FIG. 7 shows another embodiment of the heating cavity shown in FIG. 4.

Figure 1:
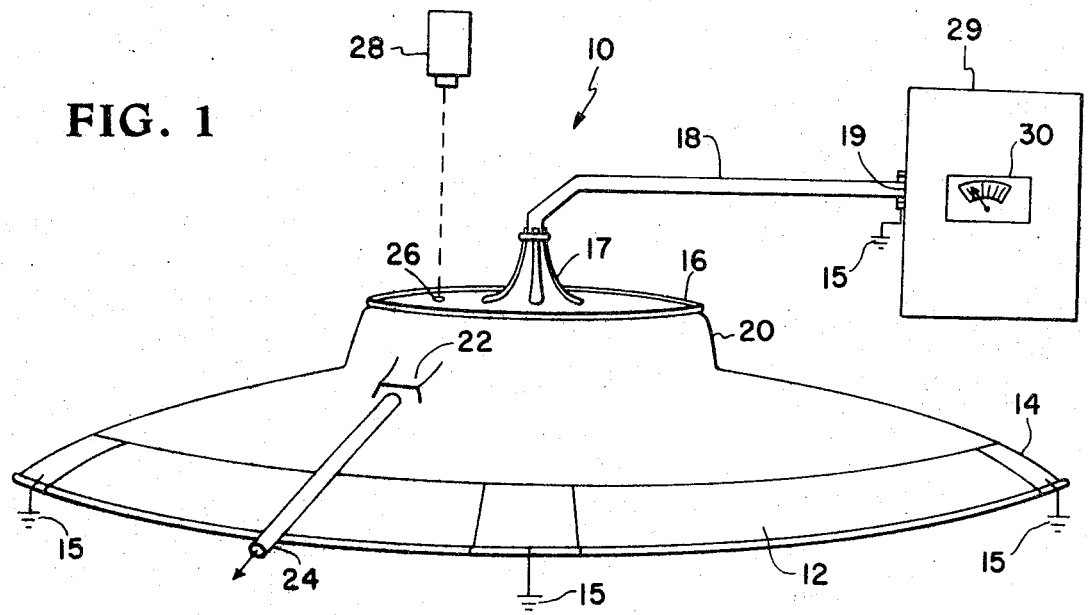
FIG. 1 shows a front elevational view of one embodiment of the present invention.
Figure 3:
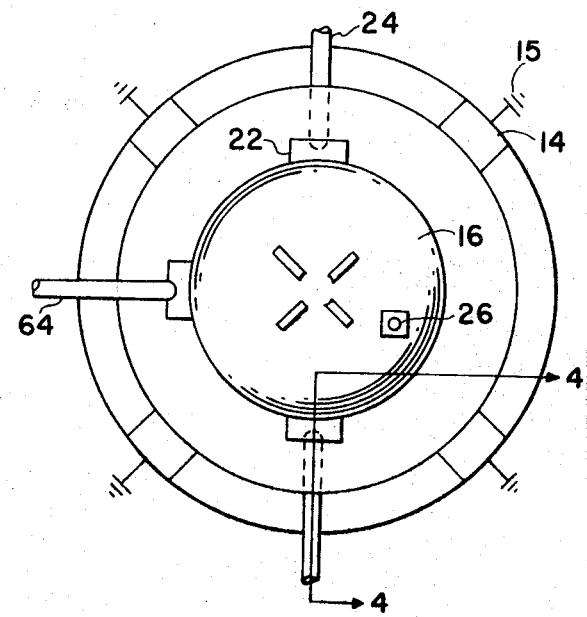
FIG. 3 shows a top view of one embodiment of the present invention.
Figure 2:
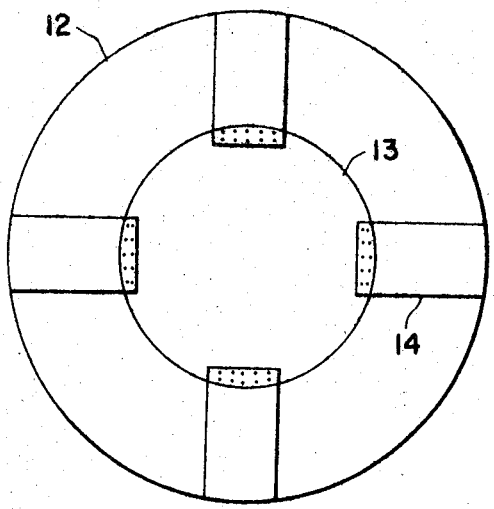
FIG. 2 shows a top view of one embodiment of the lower electrode means of the present invention.

Referring now to the drawings wherein like reference numerals designate like or similar characters, there is shown in FIGS. 1, 2 and 3 an embodiment of the invention designated generally by the reference numeral 10. The apparatus 10 has a lower electrode means comprising a shaped fiber glass electrode base 12 coated over part or all of its surface with a thin (.008 inch or so) metal foil electrode 13 which is connected to the ground cable 15 of a dielectric heating machine 29 by thin metal foil connector straps 14. The fiber glass base 12 may be flat, conical, paraboloidal, or any other generally smooth shape which the final plastic product is desired to have. The foil may be aluminum, silver, brass or other similar conducting material. In this respect, the lower electrode base 12 may be coated with any conducting material which may serve as an electrode. This coating may include, for example, graphite, metal particles, and may be a conductive paint.

An upper electrode 16 made of similar (.008 inch or so) metal foil is bonded to a flexible vacuum membrane 20 (FIG. 4) so that it will conform to the surface of the flexible membrane. A conductive material similar to the types hereinbefore mentioned with regard to the lower electrode may be attached to or formed in the flexible membrane 20. The membrane may be of the molded cast or spray-formed type. It should be noted that all materials which serve as components of the present invention that are involved in the dielectric work space must be made from substances having a dielectric permeativity preferably lower or at least similar to the material to be molded and cured. For this reason, the upper electrode 16 is bonded to a suitable membrane material with a silicon elastomer. The electrode 16 is curled up around its rim to prevent corona effects and flashover. The upper electrode 16 is attached to a coaxial feeder cable 18 (FIG. 5) connected to the generator output 19 of the dielectric machine 29 by means of connector straps 17. In suitable cases, these straps may be spot-welded to the top surface of the upper electrode 16 and removably attached to the coaxial feeder cable 18. Any method of connector strap to electrode attachment which provides a good electrical connection may be utilized.

Also located on the top surface of the upper electrode 16 is a painted flat-black circle (FIGS. 3 and 5) of approximately 1 inch in diameter. This circle is used as a target for an infrared temperature sensing device 28 (FIG. 5 and FIG. 1) having a suitable output. By focusing the device 28 on the circle 26, the temperature of the plastic being processed may be visually indicated and recorded. This may be done by connecting the device to a potentiometer or some similar instrument.

The flexible vacuum membrane 20 is designed to conform to the shape of the lower electrode means and the heating cavity formed thereon. In this respect, the heating cavity of one embodiment of the present invention is formed in the following manner (FIG. 4). Upon the foil electrode 13 is placed first two layers of square-weave fiber glass boatcloth 39 and 40 and then a layer of satin-weave fiber glass cloth 38. Porous retaining wall strips 81, 82 and 83 made of square-weave boatcloth cut into long strips is fabricated along the inside the periphery of the stacked fiber glass cloth (38, 39 and 40) which forms a porous duct in the bottom of the heating cavity. One-inch polypropylene ropes 50 are placed along the outside of the cirmumference of the retaining wall in order to reinforce it and also serve as a volatile duct, and another set of fiber glass cloth layers 44 and 45 are similarly placed around the rope parallel to the first set. In this way, a completely porous heating cavity is obtained. The plastic materials are to be placed in the cavity evenly distributed throughout so that the top surface of the material corresponds to the shape of the bottom surface of the material abutting the boat cloth. When necessary, a plurality of fiber glass cloth layers is placed over the plastic material. These layers are exactly analogous to those underneath the plastic material, comprising one layer of satin-weave fiber glass cloth 46 and two layers of square-weave fiber glass cloth 47 and 48. These layers may not be necessary if the plastic material is itself sufficiently porous. In this way, an enclosed porous heating cavity is formed which generally conforms to the size and shape of the lower electrode 13 formed over a part of the lower electrode base 12. The lower electrode 13 usually is substantially smaller than the base 12 so as to allow an overlap of the flexible vacuum membrane 20 onto the base 12, thereby facilitating a good vacuum seal.

At least three vacuum ducts 22 are formed in the flexible vacuum membrane 20 and abut the reinforced retaining wall. The molded ducts 22 may be evenly spaced around the perimeter of the heating cavity. These are filled with a plurality of sheets of the square-weave fiber glass cloth 71, 72, 73, 74, 75, 76, 77 and 78. In the center of these layers is located a vacuum line connector tube 24 made of material having suitable dielectric properties. The stacked layers of fiber glass cloth provide a porous duct through which a vacuum may be drawn along a line parallel to the surface of the electrodes. In this way percolating and gathering of liquid condensates during the molding and curing cycle is eliminated, thereby preventing vapor ionization and arc flashover.

If preferred, the ducts and retaining wall may be made into a single piece by forming them from plastic porous retaining wall-evacuation duct must have suitable dielectric properties and could be designed to fit into the flexible vacuum membrane 20, or could even be utilized to form the entire heating cavity itself by also replacing the stacked fiber glass cloth layers 38, 39 and 40 so as to incorporate them and the retaining wall-duct into a single piece of foam. FIG. 7 shows such an embodiment. The one-piece foam replacement is designated by the numeral 51, and is fitted with a foam cover 52 which would replace in suitable cases the layers of fiber glass cloth 46, 47 and 48.

Two of the vacuum line connector tubes 24 are connected to vacuum lines 54 and 55 (FIG. 5). These lines 54 and 55 are attached to a T connector 56 which in turn is attached to a hose 57. This hose 57 has attached to it several exemplary pieces of equipment, respectively, a cold trap 58, a zeolite filter 59, a 0–2 p.s.i. absolute pressure transducer 60 having a suitable output, a 0–760 mm. Hg absolute pressure indicating (visual) gage 61 and vacuum pump 62. The cold trap 58 and zeolite filter 59 serve to prevent contamination of the vacuum lines 54 and 55 by contaminants emitted by the vacuum pump 62. A separate line 64 is connected to another connector tube 24 vertically through a molded vacuum duct 22 so as to position the line 64 above the top of vacuum duct 22. The position of line 64 prevents contaminant and liquid from entering an attached 0–15 p.s.i. absolute pressure transducer 65 having a suitable output and terminates in an attached 0–760 mm. Hg absolute pressure indicating (visual) gage 66. A mass spectrometer 63 is connected to vacuum line 55 in a manner which prevents any liquid condensates from entering it. This may be done by positioning the mass spectrometer 63 above the line 55.

A 26 to 28 megacycle dielectric heating machine 29 having an output voltage controller 30 to permit infinite voltage setting of from 100 to at least 5,000 volts is used to generate the radio frequency field between the two electrodes.

In an alternate embodiment of the invention (FIG. 6), the electrodes are combined with pressure pistons to form electrode pressure pistons 132 and 133. These fit into a high pressure cylinder 136 having suitable dielectric permativity and one or both may be provided with a thrusting force 67 for applying pressure to the plastics in the high pressure cylinder 136. These electrode-pistons have vacuum duct openings 142 located around the centers of their heads. These heads have O-rings 131 for sealing with cylinder and a plurality of small apertures opening into vacuum bores 144 running through the centers of the piston rods. These are connected to a T connector 156 by means of vacuum lines 154 and 155. Three layers of fiber glass cloth 138, 139 and 140 separate the piston heads 134 and 135 from the plastic material. A satin-weave layer 138 abuts the plastic material 174 and is itself covered by two layers of square-weave fiber glass boatcloth 139 and 140, the last of these layers abutting the piston head 134. The dielectric heating machine 129 is connected to these electrode pistons 132 and 133 by cables 115 and 118. The instrumentation-vacuum line configuration is analogous to that of the previous embodiment. Two vacuum lines 154 and 155 are attached to a T connector 156 which is connected to a hose 157 having respectively attached to it a cold trap 158, zeolite filter 159, pressure transducer 160, visual pressure gage 161, and vacuum pump 162. A mass spectrometer 163 is attached to vacuum line 155 in a manner similar to that hereinbefore mentioned.

An infrared temperature sensing device 128 is focused on an infrared transparent window 137 located in the side of the high pressure cylinder 136. The heads 134 and 135 of the electrode-pistons 132 and 133 may be so formed as to cast the plastic material into the desired configuration.

The actual process involved is as follows. The plastic material is placed in the heating cavity and screeded to conform to the desired surface configuration. The top layers of porous fiber glass cloth (or a single layer of the porous plastic foam) is placed on top of the screeded material. The flexible vacuum membrane 20 is placed in position over the now filled heating cavity and down on the lower electrode base 12. Evacuation of the cavity to remove residual air and water vapor is then effected. It has been found that a pressure of 6 mm. Hg can be reached. This results in the atmospheric pressure around the membrane 20 extering an even pressure on the heating cavity and plastic materials contained therein, as can be seen in FIG. 4. In this manner, the materials are evenly compacted so that there are no density gradients formed and no air spaces between the membrane-electrode and the plastic material being cured. Once the proper evacuation level is reached, the dielectric heating machine is turned on and the dielectric field is thereby generated between the electrodes. This field heats the material in the heating cavity. As the plastic mixture heats up, it emits reaction gases. The composition of these gases varies as the reaction progresses. The mass spectrometer 63 tapped into the vacuum line 55 continuously monitors the composition of these emitted gases. Only one or two specific elements characteristic of each particular mixture need be monitored. Once the composition of the gases reaches the point indicative of proper cure, the apparatus is shut down and the plastic allowed to cool.

It is also possible to utilize the parameters of temperature and pressure to determine when a proper cure has been effected. When the plastic mixture is heated, the evolution of hot reaction gases causes an increase in the pressure within the heating cavity. This change of pressure is detected and recorded by the 15 p.s.i. transducer vacuum gage 65. It has been found that most materials will have a pressure increase, a peak, and then a decrease in pressure. In the case of ablation compounds consisting of a mixture of 30 percent phenolic resin, 60 percent hollow phenolic spheres, and 10 percent polyamide resin, good cures were obtained when the pressure dropped to approximately one fourth of the peak pressure.

The temperature of the heating cavity is controlled by controlling the voltage output of the dielectric heating machine 29. This temperature is indicated and recorded by the infrared temperature sensing device 28 connected to a potentiometer. By increasing or decreasing the voltage output of the machine 29 by a suitable output controller 30, the temperature in the heating cavity can be kept at a particular level. By keeping the temperature constant or varying it according to a predetermined schedule, it is possible to utilize the indicated changes in pressure within the cavity as a means of determining when the proper cure has been reached. This would be accomplished by making a number of trials in which the process is shut down at different stages and the best cure point is determined from an analysis of the products resulting from each trial. Once the proper parameters are determined for a particular mixture of plastics, duplication of results and quality control are easily obtained.

What is claimed as new and desired to be secured by Letters Patent of the United States is:

1. A dielectric heating apparatus for the molding and curing of plastics comprising:
    lower electrode means;
    upper electrode means;
    heating cavity means formed between said upper and lower electrode means wherein is placed the plastic material to be molded and cured;
    means for varying the pressure in said heating cavity means;
    means for generating a dielectric field between said electrode means;
    means for controlling the intensity of the dielectric field thus generated; and
    means for determining the degree of cure of the plastic material during processing.

2. The dielectric heating apparatus as in claim 1 in which the bottom electrode means is composed of a nonconductive material covered with a thin layer of conductive material.

3. The dielectric heating apparatus as in claim 1 wherein the upper electrode means is composed of thin sheet of conductive material, said electrode having its peripheral edges curled up so as to prevent corona discharge and flashover.

4. The dielectric heating apparatus as in claim 1 wherein the electrode means is a pressure piston means.

5. The dielectric heating apparatus as in claim 1 wherein the heating cavity means is comprised of a high pressure cylinder means having pressure pistons at each end.

6. A dielectric heating apparatus as in claim 1 wherein the heating cavity means includes a nonconductive porous insulator base means stacked upon the lower electrode means to form a base upon which to place the plastic material to be cured;
    nonconductive porous insulator retaining wall means located about and inside the periphery of said base means;
    nonconductive porous bracing means for said retaining wall means; and
    nonconductive porous insulator covering means located between the top of the material to be cured and a vacuum membrane means.

7. The dielectric heating apparatus as in claim 6 wherein the nonconductive porous insulator means is formed from stacked layers of fiber glass cloth.

8. The dielectric heating apparatus as in claim 6 wherein the fiber glass cloth abutting the electrode means is less closely woven than that abutting the plastic material to be cured.

9. The dielectric heating apparatus as in claim 6 wherein the retaining wall means consists of layers of square-weave fiber glass boatcloth.

10. The dielectric heating apparatus as in claim 6 in which the nonconductive porous bracing means for the retainer wall means is polypropylene rope.

11. The dielectric heating apparatus as in claim 1 wherein the heating cavity pressure varying means includes a flexible vacuum membrane means attached to the underside of the upper electrode means, said vacuum membrane means formed around the heating cavity means and being vacuum sealed to the lower electrode means about the outside of the periphery of said heating cavity means; vacuum duct means formed in said flexible vacuum membrane means, said vacuum means abutting the retaining wall means; evacuation means connected to said vacuum duct means by vacuum tubes made of material having suitable dielectric properties; and means for indicating pressure in the evacuated system.

12. The dielectric heating apparatus as in claim 1 wherein the vacuum duct means are comprised of cavities filled with a plurality of layers of square-weave porous fiber glass cloth having vacuum tubes inserted in the middle of said plurality of cloth layers.

13. The dielectric heating apparatus as in claim 1 wherein said plurality of cloth layers are parallel to the vacuum tubes facilitating the draining of liquid condensates from said heating cavity.

14. The dielectric heating means as in claim 1 wherein the heating cavity retaining wall-vacuum duct means combination is formed from a single piece of plastic foam having interconnected cells and suitable dielectric properties.

15. The dielectric heating apparatus of claim 1 wherein said degree of cure determining means includes an infrared sensing means for ascertaining the temperature within the heating cavity;
    means for analyzing the composition of gases as they emanate from the plastic being cured; and means for determining the pressure within the heating cavity;

said cure determining means utilizing a combination of at least two of the above-mentioned means to ascertain when proper cure has been reached.

16. The dielectric heating apparatus as in claim 1 wherein said degree of cure determining means is a gage for determining the pressure within the heating cavity.

17. The dielectric heating apparatus of claim 1 wherein said degree of cure determining means is mass spectrometer means for analyzing the gases evacuated from the heating cavity.

18. The dielectric heating apparatus of claim 1 wherein said degree of cure determining means is an infrared sensing means for ascertaining the temperature within the heating cavity.

19. The dielectric heating apparatus in claim 18 wherein the means for determining the degree of cure includes infrared sensing means focused on a painted flat-black circle of suitable diameter located on the top surface of the upper electrode means.

20. The dielectric heating apparatus as in claim 5 wherein the means for determining the degree of cure includes infrared sensing means focused through an infrared transparency located in the side of the high pressure cylinder serving as a heating cavity retaining wall.

21. The dielectric heating apparatus as in claim 1 where in lower electrode means is a conductive device which is to be coated with the cured plastic such that the plastic is molded, cured and bonded to said electrode means during the process.

References Cited

UNITED STATES PATENTS

| | | | |
|---|---|---|---|
| 2,232,103 | 2/1941 | Ernst et al. | 18—16 |
| 2,319,727 | 5/1943 | Duggan. | |
| 2,694,922 | 11/1954 | Vilella. | |
| 2,975,476 | 3/1961 | Burke. | |
| 3,092,165 | 6/1963 | Harvey. | |
| 3,140,512 | 7/1964 | Hausman. | |
| 3,182,102 | 5/1965 | Simnad. | |
| 3,248,758 | 5/1966 | Schmitz et al. | 249—134 |
| 3,277,524 | 10/1966 | Silver | 18—5 |
| 3,388,203 | 6/1968 | Meininger et al. | |
| 3,401,425 | 9/1968 | Fink | 18—16 |
| 2,506,814 | 5/1950 | Sayre. | |
| 2,522,487 | 9/1950 | Warren. | |
| 2,920,172 | 1/1960 | Stallard. | |
| 3,431,326 | 3/1969 | Letter | 264—313X |
| 3,444,739 | 5/1969 | Treharne | 73—355 |

J. SPENCER OVERHOLSER, Primary Examiner

R. L. SPICER, Jr., Assistant Examiner

U.S. Cl. X.R.

18—34